(12) United States Patent
Wang et al.

(10) Patent No.: US 7,995,685 B2
(45) Date of Patent: Aug. 9, 2011

(54) BACKSCATTER INTERROGATOR RECEPTION METHOD AND INTERROGATOR FOR A MODULATED BACKSCATTER SYSTEM

(75) Inventors: Zhaocheng Wang, Stuttgart (DE); Ralf Böhnke, Esslingen (DE); Jochen Rebmann, Backnang (DE)

(73) Assignee: Sony Deutschland GmbH, Cologne (DE)

( * ) Notice: Subject to any disclaimer, the term of this patent is extended or adjusted under 35 U.S.C. 154(b) by 1394 days.

(21) Appl. No.: 11/210,229

(22) Filed: Aug. 23, 2005

(65) Prior Publication Data

US 2006/0045219 A1    Mar. 2, 2006

(30) Foreign Application Priority Data

Aug. 24, 2004   (EP) .................................... 04020074

(51) Int. Cl.
*H03D 1/04* (2006.01)
*H03D 1/06* (2006.01)
*H04B 1/10* (2006.01)

(52) U.S. Cl. ...... 375/346; 340/10.1; 455/41.2; 455/41.3
(58) Field of Classification Search .......... 375/346–350; 455/40–41.3; 340/10.1–10.3
See application file for complete search history.

(56) References Cited

U.S. PATENT DOCUMENTS

| 3,696,429 | A | | 10/1972 | Tressa |
| 4,970,519 | A | * | 11/1990 | Minnis et al. ................. 342/165 |
| 4,991,165 | A | | 2/1991 | Cronyn |
| 5,974,301 | A | * | 10/1999 | Palmer et al. ................. 455/63.1 |
| 6,459,726 | B1 | | 10/2002 | Ovard et al. |
| 6,611,224 | B1 | | 8/2003 | Nysen et al. |
| 7,058,368 | B2 | * | 6/2006 | Nicholls et al. ............. 455/114.2 |
| 2002/0015436 | A1 | | 2/2002 | Ovard et al. |
| 2002/0149484 | A1 | | 10/2002 | Carrender |
| 2004/0002318 | A1 | * | 1/2004 | Kerth et al. .................... 455/302 |
| 2004/0027240 | A1 | * | 2/2004 | Greeff et al. .................. 340/10.3 |
| 2005/0058292 | A1 | * | 3/2005 | Diorio et al. .................. 380/270 |

FOREIGN PATENT DOCUMENTS

EP    0 851 639 A2    7/1998
(Continued)

OTHER PUBLICATIONS

Behzad Razavi, "Design Considerations for Direct-Conversion Receivers" IEEE Transactions on Circuits and Systems-II: Analog Digital Signal Processing, vol. 44, No. 6, Jun. 1997, pp. 428-435.

(Continued)

*Primary Examiner* — Curtis B Odom
(74) *Attorney, Agent, or Firm* — Oblon, Spivak, McClelland, Maier & Neustadt, L.L.P.

(57) ABSTRACT

In a backscatter interrogator reception method, a continuous carrier signal with a frequency $f_c$ is sent from an interrogator to a tag device over a wireless link, the tag device transmits data to the interrogator using a modulated backscatter signal, and the received modulated backscatter signal is demodulated by the interrogator to retrieve the data transmitted from the tag device. According to the present invention, the interrogator estimates the phase and the amplitude of an inband interferer signal contained in the received modulated backscatter signal, generates a cancellation signal having the opposite phase and the same amplitude as the estimation of the inband interferer signal, and combines said cancellation signal with the received backscatter signal in order to reduce the influence of the inband interferer signal. In addition, a two-stage interferer cancellation scheme is proposed.

13 Claims, 4 Drawing Sheets

FOREIGN PATENT DOCUMENTS

| | | |
|---|---|---|
| EP | 0 853 245 A3 | 7/1998 |
| JP | 2002-043992 | 2/2002 |
| JP | 2002-507031 | 3/2002 |
| WO | WO 00/21204 | 4/2000 |

OTHER PUBLICATIONS

Ashok Kumar Marath, et al. "Performance Analysis of a Homodyne Receiver in Modulated Backscattered System for Intelligent Transportation" IEEE, 1999, pp. 1198-1202.

M. Declercq, et al. "Active Backscattering Techniques for Micro-Power Short-Range Data Transmission" 2 pages.

M. Kossel, et al. "Microwave Backscatter Modulation Systems" IEEE, 2000, pp. 1-5.

Shahriar Mirabbasi, et al. "Classical and Modern Receiver Architectures" Topics in Circuits for Communications, IEEE Communications Magazine, Nov. 2000, pp. 132-139.

Daeyoung Kim, et al. "Small-scale Fading for an Indoor Wireless Channel with Modulated Backscatter" $54^{th}$ Vehicular Technology Conference, IEEE, 2001, pp. 1616-1620 and 1 page.

Tom Ahlkvist Scharfeld "An Analysis of the Fundamental Constraints on Low Cost Passive Radio-Frequency Identification System Design" 115 pages.

Japanese Office Action (English translation) issued Feb. 8, 2011 in Japanese Patent Application No. 2005-243156. (3 pages).

* cited by examiner

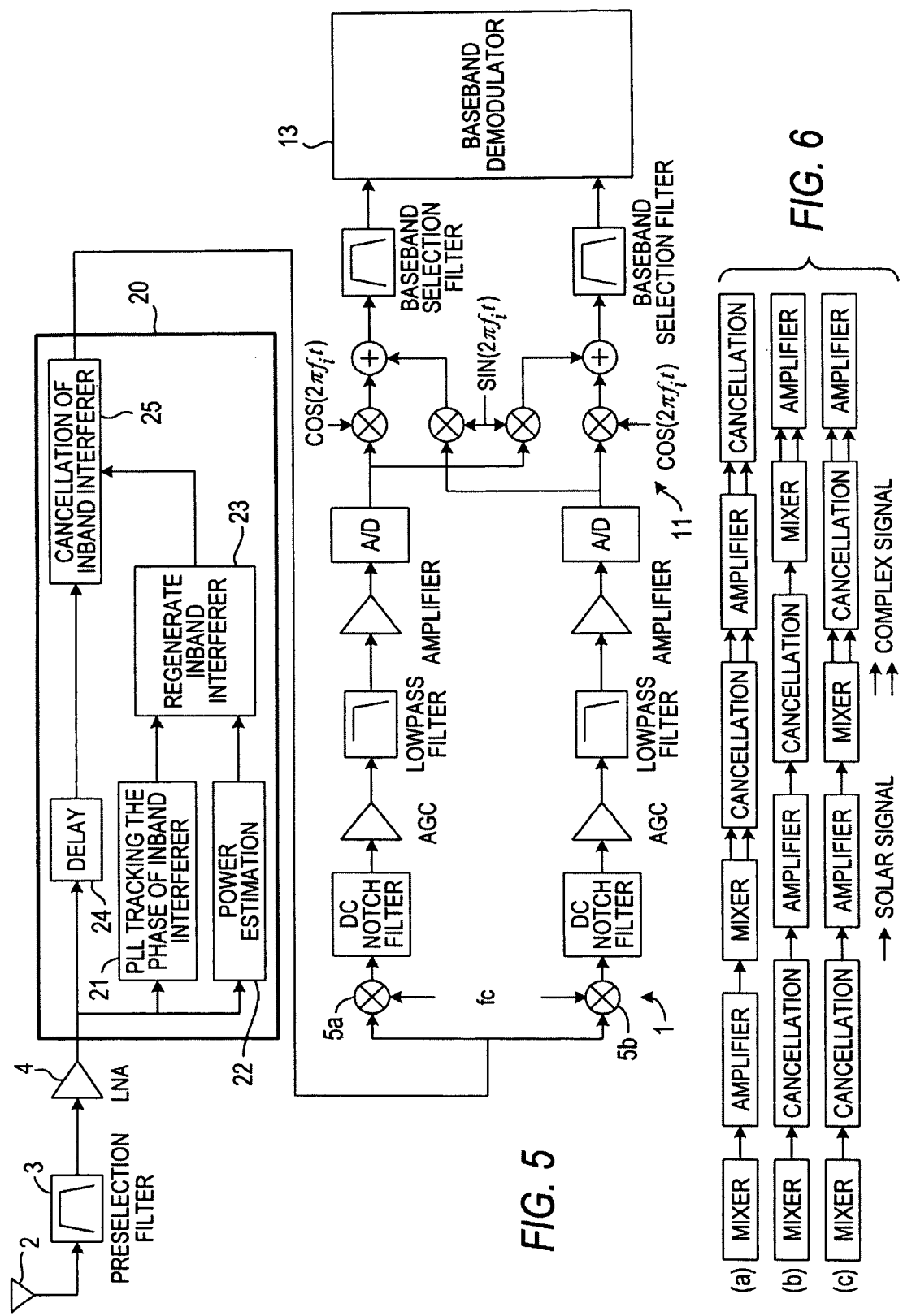

BACKSCATTER INTERROGATOR RECEPTION METHOD AND INTERROGATOR FOR A MODULATED BACKSCATTER SYSTEM

BACKGROUND OF THE INVENTION

1. Field of the Invention

The present invention relates to a method for backscatter interrogator reception as well as to an interrogator for use in a modulated backscatter system (MBS).

2. Description of the Related Art

Modulated backscatter systems are known in the art and are the basis for the recently developed so-called radio frequency identification (RFID) systems. These RFID systems are for example used for identifying and/or tracking equipment, inventory, persons or animals. RFID systems are radio communication systems that allow communication between a radio transceiver, called an interrogator, and at least one so-called tag. In an RFID system the interrogator communicates with the tag by transmitting an unmodulated radio signal which is received, modulated and transmitted back by the tag to the interrogator.

The general idea underlying a modulated backscatter system is shown in FIG. 1. Similar to the field of radar technology, backscatter communication is based on the idea that electromagnetic waves are reflected by an object. The efficiency with which an object reflects electromagnetic waves is described by its radar cross-section. Objects that are in resonance with the wave front that hits them, as it is the case for antennas at the appropriate frequency, for example, have a particularly large radar cross-section.

In the general modulated backscatter system shown in FIG. 1, a signal P1 is emitted from a transmitting circuit 101 of interrogator 100, a small portion P1' of which reaches the antenna 111 of the tag 110.

A proportion of the incoming power P1' is reflected by the antenna 111 of the tag 110 and returned as power P2. The reflection characteristics of the antenna 111 can be influenced by altering the load connected to the antenna 111. In order to transmit data from the tag 111 to the interrogator 110, two different load impedance values Z and Z' in the embodiment of FIG. 1 are alternately connected with the antenna 111 in time with the data stream to be transmitted. In this way, the amplitude of the power P2 reflected from the tag 110 can be modulated resulting in a modulated backscatter signal.

The power P2 reflected from the tag 110 is again radiated into free space wherein a small proportion P2' of this is picked up by the antenna 103 of the interrogator 100. The reflected signal therefore travels into the antenna connection of the interrogator 100 in the backwards direction and can be decoupled and transferred to a receiver 102 of the interrogator 100 where the signal is demodulated in order to retrieve the information transmitted by the tag 110. Alternatively the antenna 103 can be split into a distinct transmit antenna and a separate reception antenna which are spatially separated and thereby eliminating the requirement for a de-coupler in the interrogator 100.

One problem arising with the use of backscatter communication is the appearance of strong so-called inband interferer. In the modulated backscatter system explained above, a part of the emitted radio frequency waveform P1 from the interrogator 100 is feed back into the interrogator receiver 102. Here, it will multiply with a local oscillator (LO) signal and generate an unwanted baseband signal, which is proportional to the power of the leakage from the interrogating waveform, differential delay between the interrogator 100 and the tag 110 and etc. As a result, the performance of the interrogator receiver 102 and the useable range for the modulated backscatter system are degraded.

SUMMARY OF THE INVENTION

Accordingly, it is an object of the present invention to overcome the problems mentioned above by providing an interrogator for use in a modulated backscatter system wherein the performance of the receiver sensitivity of the interrogator is improved.

The present invention proposes a novel idea for reducing the effect of the leakage of the interrogating RF waveform—called inband interferer—allowing to achieve an improved receiver sensitivity.

Since inband interferers always exist in modulated backscatter systems and are much stronger than the received backscatter signal itself, it is—according to a first aspect of the present invention—proposed to adopt the principle of a Phase Locked Loop (PLL) in order to track the phase and amplitude of the strong inband interferer and to generate a cancellation signal that is equal in amplitude and 180° out of phase with the inband interferer. After that, this generated cancellation signal is combined with the received signal to implement an inband interferer cancellation before the received signal is forwarded to the next stage in which the signal is finally demodulated in order to retrieve the data transmitted from the tag. By using this technique, the power level of inband interferer is significantly reduced and an improved receiver sensitivity can be obtained.

According to the first aspect of the present invention, a backscatter interrogator reception method is proposed wherein a continuous unmodulated carrier signal with a frequency $f_c$ is sent from an interrogator to a tag device or multiple tag devices over a wireless link, a tag device transmits data to the interrogator using a modulated backscatter signal, which is generated by modulating the received carrier signal with or without an intermediate frequency $f_i$ and the received modulated backscatter signal is demodulated by the interrogator to retrieve the data transmitted from the tag device, wherein the interrogator estimates the phase and amplitude of an inband interferer signal contained in the received modulated backscatter signal and having a frequency $f_c$ corresponding to the carrier frequency, the interrogator generates a cancellation signal having the opposite phase and the same amplitude as the estimation of the inband interferer signal, and combines said cancellation signal with the received modulated backscatter signal in order to reduce the influence of the inband interferer signal.

Also in accordance with this first aspect of the present invention, an interrogator for use in a modulated backscatter system is provided comprising transmitting means for transmitting a continuous unmodulated carrier signal with a frequency $f_c$ to a tag device, receiving means for receiving a backscatter signal obtained by a modulation of the carrier signal and demodulating means for retrieving data transmitted from a tag device, wherein the interrogator further comprises inband interferer cancellation means for a) estimating the phase and the amplitude of an inband interferer signal contained in the received modulated backscatter signal and having a frequency $f_c$ corresponding to the carrier frequency, b) generating a cancellation signal having the opposite phase and the same amplitude as the estimation of the inband interferer signal and
c) combining the cancellation signal with the received backscatter signal in order to reduce the influence of the inband interferer signal.

For long distance backscatter transmissions from the tag to the interrogator (e.g. more than 5 m), the inband interferer can be more than 60 db stronger than the received backscatter signal. Here, an one-stage inband interferer cancellation as commonly used in known prior art RFID systems cannot cancel the inband interferer efficiently enough. Accordingly, a good receiver sensitivity and a large dynamic range cannot be guaranteed.

The present invention therefore proposes according to a second aspect an improved receiver structure, which concatenates a two-stage inband interferer cancellation scheme efficiently to eliminate the inband interferer. In particular, the present invention proposes an improved super-heterodyne receiver structure with which a good receiver sensitivity can be achieved.

According to this second aspect of the present invention, a backscatter interrogator reception method is proposed wherein
a continuous unmodulated carrier signal with a frequency $f_c$ is sent from an interrogator to a tag device or multiple tag devices over a wireless link,
a tag device transmits data to the interrogator using a modulated backscatter signal, which is generated by modulating the received carrier signal with or without an intermediate frequency $f_i$ and
the received modulated backscatter signal is demodulated by the interrogator to retrieve the data transmitted from the tag device,
wherein the influence of an inband interferer signal contained in the received modulated backscatter signal is reduced in two consecutive stages. Preferably, the received modulated backscatter signal is down-converted to an intermediate frequency $f_0$, bandpass filtered at said intermediate frequency $f_0$ and filtered, again, with a pair of notch filters in the baseband in order to reduce the influence of the inband interferer signal.

Also in accordance with this second aspect of the present invention, an interrogator for use in a modulated backscatter system is provided comprising
transmitting means for transmitting a continuous unmodulated carrier signal with a frequency $f_c$ to a tag device,
receiving means for receiving a backscatter signal obtained by a modulation of the carrier signal and
demodulating means for retrieving data transmitted from a tag device,
wherein the interrogator further comprises two cancellation circuits for reducing the influence of an inband interferer signal contained in the received modulated backscatter signal in two following stages.

Preferred embodiments of the invention are described in the following with reference to the accompanying drawings.

BRIEF DESCRIPTION OF THE SEVERAL VIEWS OF THE DRAWINGS

FIG. 5 shows an improved interrogator receiver structure in accordance with a first aspect of the present invention.
FIG. 6 shows schematically three different possibilities for a two-stage inband interferer cancellation, where single arrow means a real scalar signal and double arrow means a complex signal with in phase and quadrature phase components.

DETAILED DESCRIPTION OF THE INVENTION

Figure 1:
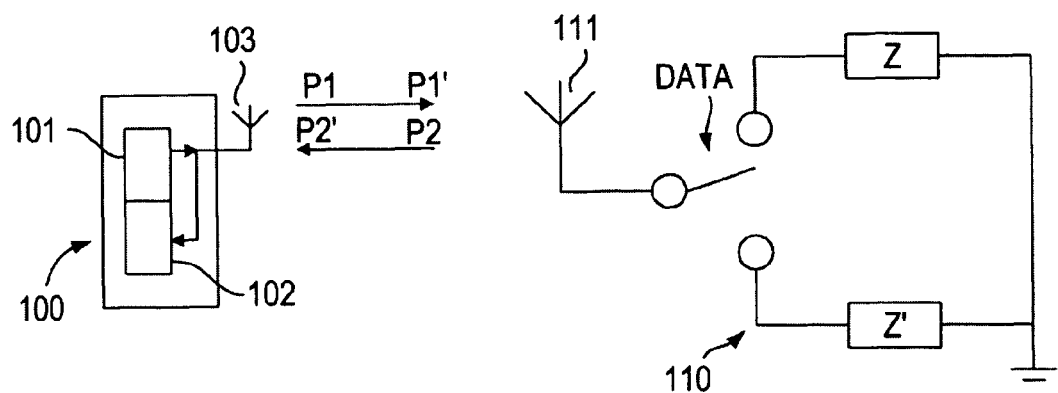
FIG. 1 shows schematically the principles of a modulated backscatter system.

The principles of modulated backscatter communication have already been explained with reference to FIG. 1. Again, in order to achieve a modulation of the signal P1 emitted from the interrogator 100, the load impedance of the antenna 111 of the tag 110 is changed for example between values representing the data signals "1" and "0". From the point of view of the interrogator 100, the interrogating radio frequency waveform reflected by the tag 110 is switched in its amplitude (and/or phase) between those two values. When the switch is closed the antenna 111 becomes the electrical equivalent of a single half-wave length antenna that reflects a portion of the power; when the switch is open, the antenna 111 becomes the electrical equivalent of a two quarter wave length antenna that reflects very little of the power. This effect corresponds to an amplitude-shift-keying (ASK) modulation with a small modulation depth.

Figure 2:
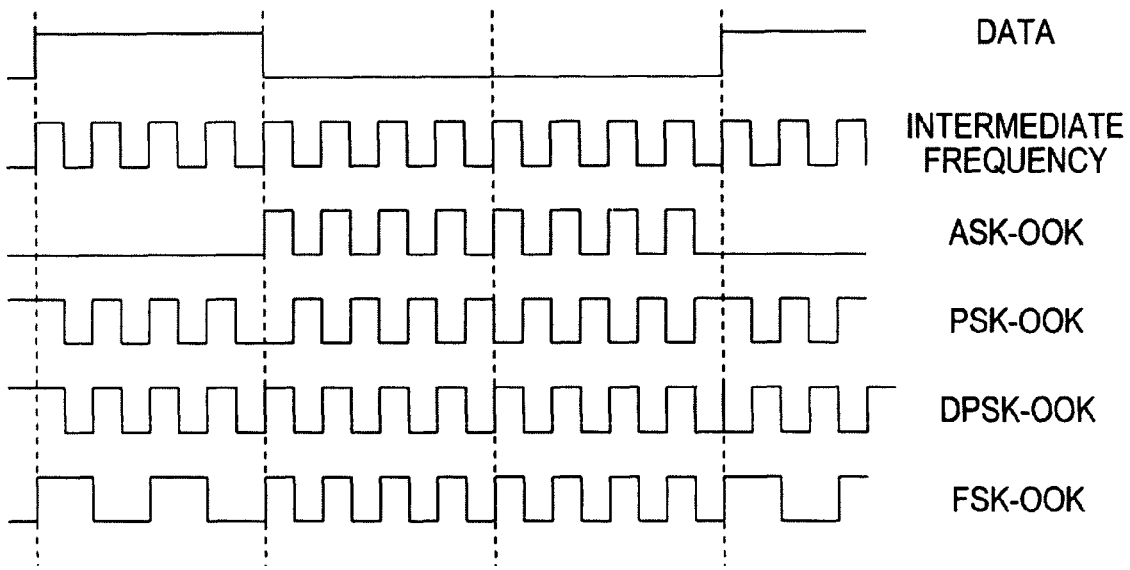
FIG. 2 is a chart showing typical intermediate frequency modulated backscatter modulation schemes.

The modulated reflected signal P2 is called the MBS signal, which will be received by the interrogator 100 together with a strong inband interferer. In order to reduce the effect of the inband interferer and phase noise, flicker noise and jitter introduced by a local oscillator (LO) of the interrogator 100, the spectrum of the MBS signal shall be far away from the leakage of the interrogating RF carrier frequency (called the inband interferer), which can be implemented by the introduction of an intermediate frequency. Examples of various intermediate frequency MBS modulation schemes are shown in FIG. 2.

Figure 3:
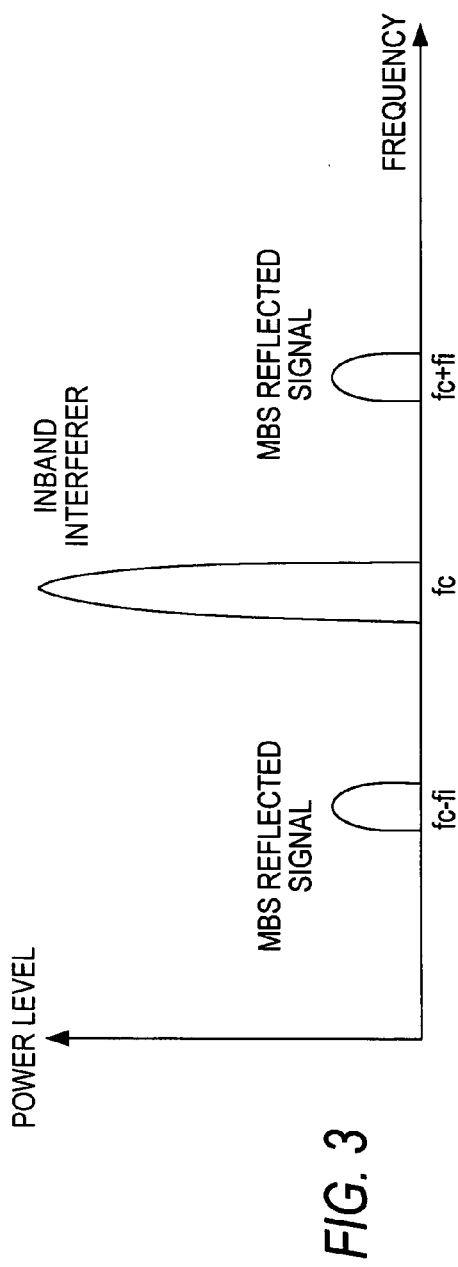
FIG. 3 shows a typical spectrum of an intermediate frequency MBS signal.

FIG. 3 shows the typical spectrum of the intermediate frequency MBS signal received by the antenna 101 of the interrogator 100 where $f_c$ is the carrier frequency of the interrogating carrier signal P1 and $f_i$ is the MBS intermediate frequency. In a typical RFID scenario, the power of the inband interferer is approximately 25 db higher than that of the MBS reflected signal. If the range between the interrogator 100 and the tag 110 is extended, for example to more than 5 m, the power of the reflected MBS signal is further reduced by approximately 35 dB or even more. Thus, the power of the inband interferer can be about 60 dB higher than that of the MBS signal.

At the interrogator 100, the inband interferer will be multiplied with the local oscillator and an unwanted baseband noise is generated. Part of this noise overlaps with the spectrum of the MBS signal, which is proportional to the power level of the inband interferer, the round trip delay between the interrogator 100 and the tag 110 and etc. If the noise level approximates that of the MBS signal, the reflected MBS signal cannot be demodulated and a reliable data transmission cannot be guaranteed.

The present invention now provides an improved interrogator receiver structure that allows to expand the operating range of classical modulated backscatter systems by reducing the effect of the inband interferer.

Figure 4:
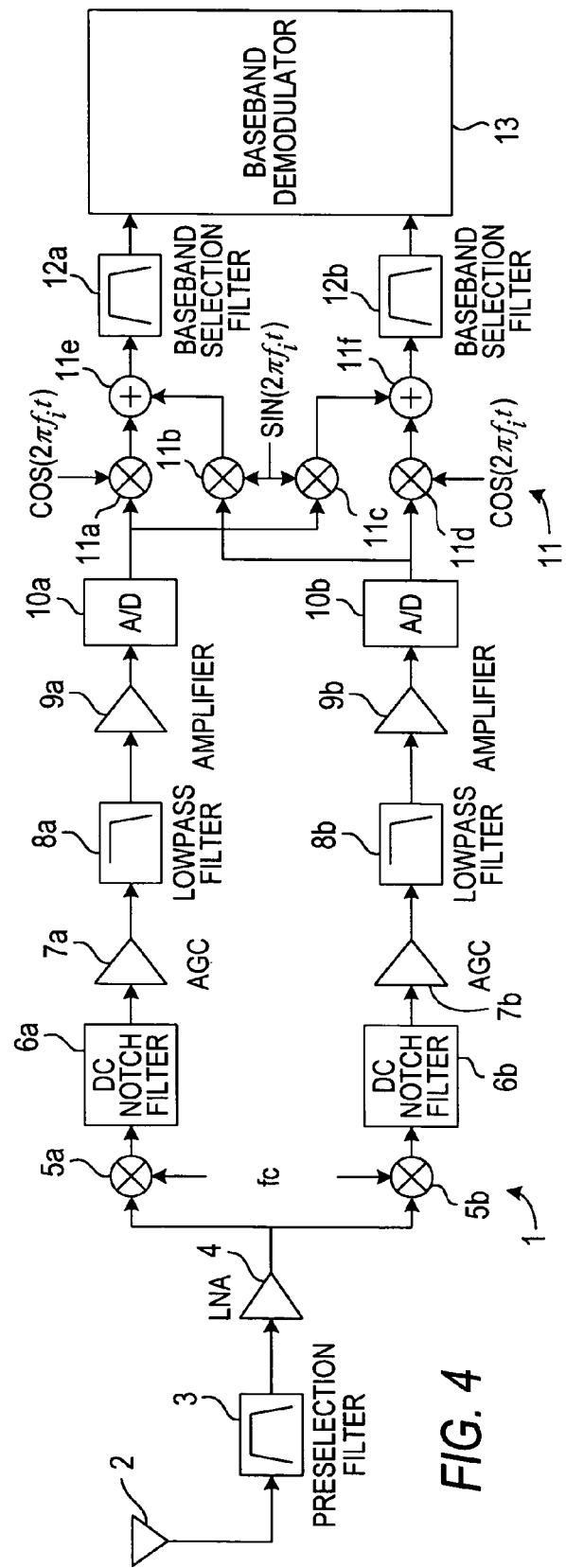
FIG. 4 shows a known interrogator receiver structure for use in a modulated backscatter system.

The receiver structure proposed in accordance with the present invention is based on a known receiver structure, which is shown in FIG. 4. This known structure combines the benefits of a direct down-conversion architecture with that of a low intermediate frequency (IF) architecture. Before the improvements in accordance with the present invention are explained, the function of the known receiver structure of FIG. 4 is shortly summarised in the following.

In this known receiver structure, the MBS signal received by the antenna 2 passes at first a pre-selection filter 3 in order to remove out-of-band signal energy as well as partially reject image signals. After this filter, the signal is amplified by a low noise amplifier (LNA) 4.

This signal is now mixed by two quadrature mixers 5a and 5b and down-converted to an intermediate frequency resulting in a real and an imaginary part of the down-converted signal, the so-called in phase component (upper branch of the receiver structure) and the quadrature phase component (lower part).

Both signal components are passed through two DC notch filters 6a, 6b to two automatic gain controllers (AGC) 7a, 7b which forward the amplified signal components to lowpass filters 8a, 8b and further amplifiers 9a and 9b. The signal components amplified by amplifiers 9a and 9b are now converted by two analog/digital converters (A/D) 10a and 10b and again complex-mixed in a complex mixing configuration 11 comprising four mixers 11a to 11d and two adders 11e and 11f. Finally, the signals are passed again through two baseband selection filters 12a and 12b and demodulated by a digital signal processor 13.

This receiver architecture shown in FIG. 4 has been described in J. Crols and M. S. J. Steyaert "Low-IF Topologies for High-Performance Analogue Front Ends of Fully Interrogated Receivers" and Shahriar Mirabbasi and Ken Martin "Classical and Modern Receiver Architectures". This receiver topology is a combination of known heterodyne and homodyne receiver structures and allows a reliable demodulation of the received signals. For further information regarding the detailed function of the several components of the receiver structure, it is referred to the two above-mentioned publications.

The first aspect of the present invention now provides a further development of the known receiver structure, which is shown in FIG. 5. In particular, this first aspect of the present invention relates to the shadowed part which is located between the low noise amplifier (LNA) 4 and the first down-conversion stage consisting of the two mixers 5a and 5b and serves to reduce the power of inband interference before the signal enters the next stage, which is similar to that already known from FIG. 4.

The shadowed part provides an inband interferer pre-cancellation 20 structure for significantly reducing the power of the inband interferer. Elements of the pre-cancellation structure 20 are at first tracking means 21 and power estimation means 22 for estimating the phase and the amplitude of an inband interferer signal contained in the signal received from the low noise amplifier 4. On the basis of the information obtained from the tracking means 21 and the power estimation means 22, a cancellation signal is generated by a cancellation signal generator 23 which cancellation signal is combined with the delayed MBS signal forwarded by the low noise amplifier 4. Thus, the pre-cancellation structure 20 further comprise a delay circuit 24 for delaying the MBS signal and a combining circuit 25 for combining the two signals.

As a result of the combination of both signals (the delayed MBS signal and the cancellation signal), the power level of the inband interferer is significantly reduced since the cancellation signal is equivalent in amplitude to the original inband interferer but 180° out of phase. Thus, before the received MBS signal is forwarded to the next stage, the effect of inband interferer is reduced and the overall receiver performance is improved.

It has to be noted that the pre-cancellation of the inband interfere has been shown as an improvement of the known receiver structure of FIG. 4. However, the present invention is not in any way limited to this specific receiver structure but can also be used with other receiver structures in order to reduce—already at the beginning of the signal demodulation—the influence of inband interferer.

Coming back to the receiver structure shown in FIG. 4, the one-stage inband interferer cancellation scheme used in this known structure is simple and good enough for conventional RFID systems since the required receiver sensitivity is about −70 dBm and the inband interferer is about 25 dB stronger than the MBS signal. However, the performance of the known structure is not good enough to support a long range MBS transmission, which would require a receiver sensitivity better than −100 dBm under the existence of inband interferer which can be about 60 dB stronger than the MBS signal.

According to a second aspect of the present invention, an efficient concatenation of a two-stage inband interferer cancellation working at different frequencies is proposed and explained in the following.

The cancellation circuit can be understood as a filter, whereby it can be implemented as either one IF SAW (surface acoustic wave) bandpass filter in the conventional super heterodyne structure or a pair of DC notch filters in the conventional homodyne structure (for in-phase and quadrature signal component). Both of the two alternatives have some benefits and drawbacks. For example, a pair of DC notch filters can reduce the inband interferer and at the same time eliminate the common mode noise but suffers in dynamic range and channel selectivity. The IF bandpass filter on the other hand can reduce the inband interferer and at the same time obtain good dynamic range and channel selectivity; however, it is expensive, difficult to be integrated into a chip design and cannot eliminate the common mode noise.

If a two-stage inband interferer cancellation scheme is introduced, the different components can be arranged in different ways as shown in FIG. 6:

According to the first possibility shown in FIG. 6a, two consecutive cancellation circuits are used after a second mixer in order to reduce the generated noise level. The cancellation circuits are very cheep since they work in or near the baseband. However, since the whole RF link before the two cancellation circuits should be linear under the strong inband interferer, it seems to be unrealistic to adopt the structure of FIG. 6a.

In the second alternative shown in FIG. 6b, two consecutive cancellation circuits are placed just after the first mixer wherein the background noise level is generated by only one mixer and is partly overlapping with the spectrum of the MBS signal. The design of said mixer is difficult to realise assuming that the noise figure budget shall be kept unchanged. In addition, two IF SAW bandpass filters are more expensive and common mode noise cannot be eliminated.

The novel and more efficient concatenation of a two-stage cancellation circuit is shown in FIG. 6c, wherein the noise level can be reduced without additional complexity increase. A non-quadrature cancellation circuit is used after the first down-conversion mixer, which is cheaper than quadrature cancellation circuits as shown in FIG. 6a and no image interference overlapping happens. The second cancellation circuit uses quadrature cancellation circuits (a pair of DC-notch filters) since they work in or near the baseband, which are less costly. Therefore, common mode noise can be reduced.

In summary, with the structure of FIG. 6c the receiver performance is improved in the following points:

a) The cancellation of the inband interferer can be efficiently concatenated and therefore the effect of a more than 60 dB higher inband interferer can be eliminated thoroughly. Accordingly, the receiver sensitivity can be obtained.

b) A combination of the benefits of an IF SAW bandpass filter and a pair of DC notch filters, i.e. good dynamic range, channel selectivity and the cancellation of common mode noise are achieved.

c) In comparison with the super heterodyne receiver architecture using a single IF SAW filter, the part count and the cost are only slightly increased.

Figure 7:
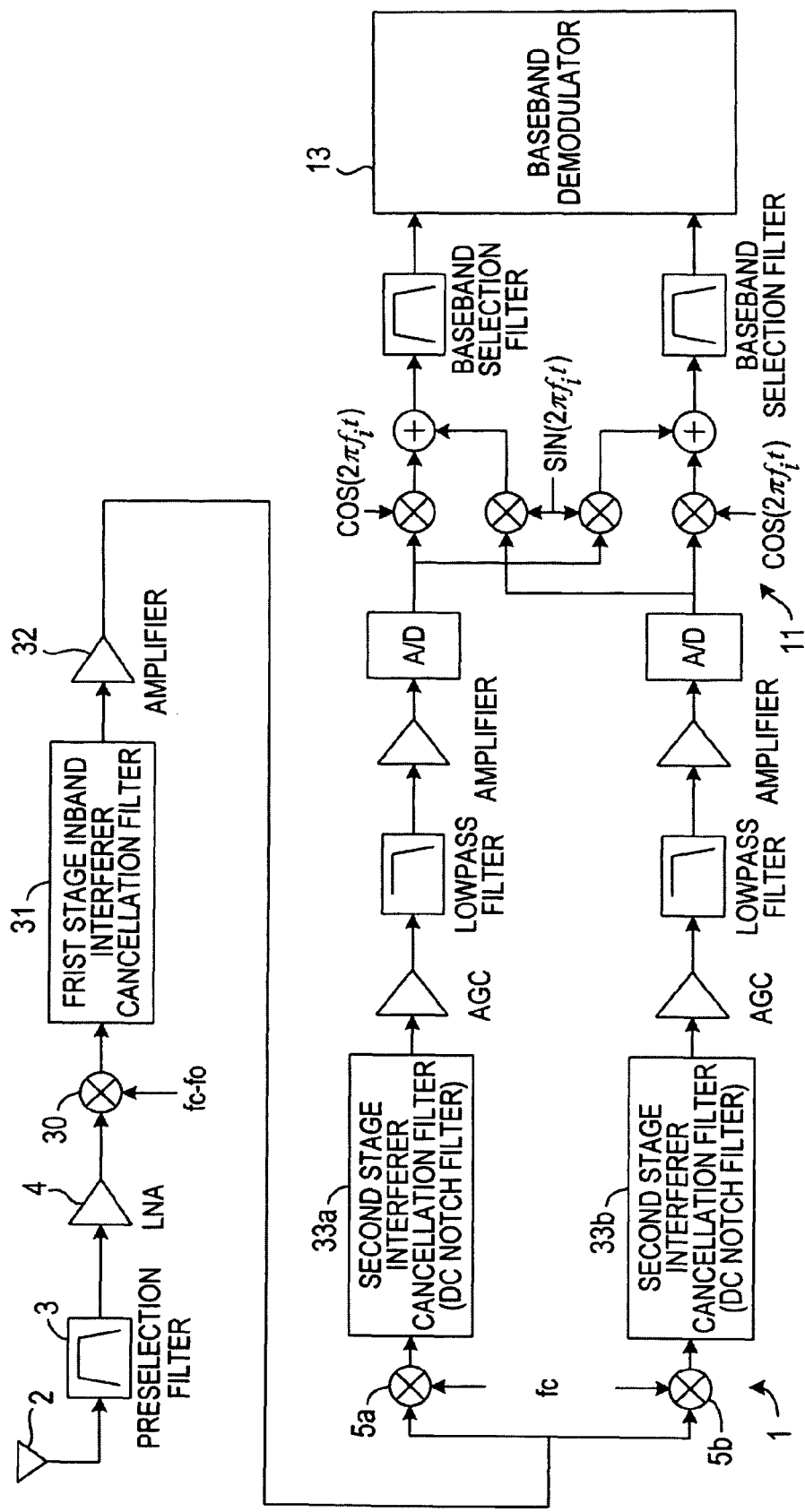
FIG. 7 shows an embodiment of an interrogator receiver structure in accordance with the second aspect of the present invention in which an additional intermediate frequency $f_0$ is introduced and a two-stage inband interferer cancellation is realised.

FIG. 7—in which similar reference signs refer to similar components as in the structures of FIGS. 4 and 5—finally shows a block diagram of the improved two-stage interferer cancellation receiver architecture explained above. An additional intermediate frequency $f_0$ is inserted to implement the first stage interferer cancellation circuit and the channel selection filter. At this stage, a non quadrature solution is preferably adopted since the filter is not cheap. The signal obtained from the low noise amplifier 4 is thus at first mixed in a mixer 30 with a first mixing frequency $f_c$-$f_0$ and then forwarded to the first stage inband interferer cancellation filter 31 and an amplifier 32. The second interferer cancellation circuits however, are implemented by a pair of DC notch filters 33a, 33b located at the outputs of the two mixers 5a, 5b, whereby quadrature processing is adopted for both inband interferer reduction and common mode noise cancellation.

In summary, the present invention provides a simple and relatively cheap solution for significantly increasing the receiver sensitivity of an interrogator for a MBS system. Accordingly, a reliable data transmission can be obtained and the useable range of MBS systems is extended.

The invention claimed is:

1. A backscatter interrogator reception method, comprising the successive steps of:
    sending a continuous carrier signal with a frequency $f_c$ from an interrogator to a tag device over a wireless link;
    transmitting data from the tag device to the interrogator using a modulated backscatter signal;
    estimating by the interrogator a phase and an amplitude of an inband interferer signal contained in the received modulated backscatter signal and having a frequency $f_c$ corresponding to the carrier frequency, said inband interferer signal being an effect of leakage of the carrier signal, said estimating including estimating the phase and the amplitude using the modulated backscatter signal as an input signal;
    generating by the interrogator a cancellation signal having an opposite phase and a same amplitude as estimated in the estimating step for the inband interferer signal;
    combining said cancellation signal with the received modulated backscatter signal in order to reduce an influence of the inband interferer signal; and
    demodulating the received modulated backscatter signal by the interrogator to retrieve the data transmitted from the tag device.

2. The method according to claim 1, wherein the received modulated backscatter signal is delayed before the combination with the cancellation signal.

3. The method according to claim 1, wherein the received modulated backscatter signal is prefiltered and amplified before the reduction of the influence of the inband interferer.

4. A backscatter interrogator reception method, comprising:
    sending a continuous carrier signal with a frequency $f_c$ from an interrogator to a tag device over a wireless link;
    transmitting data from the tag device to the interrogator using a modulated backscatter signal; and
    demodulating the received modulated backscatter signal by the interrogator to retrieve the data transmitted from the tag device;
    reducing an influence of an inband interferer signal contained in the received modulated backscatter signal in two following stages by two cancellation circuits, said inband interferer signal being an effect of leakage of the carrier signal, and an output of a mixer being connected to an input of the second cancellation circuit; and
    down-converting the received modulated backscatter signal to an intermediate frequency $f_0$, bandpass filtering at said intermediate frequency $f_0$ and filtering, again, with a pair of notch filters at baseband in order to reduce the influence of the inband interferer signal, an input of the notch filters being fed with an analog signal.

5. The method according to claim 4, wherein the received modulated backscatter signal is prefiltered and amplified before the reduction of the influence of the inband interferer.

6. An interrogator for use in a modulated backscatter system, said interrogator comprising:
    transmitting means for transmitting a continuous carrier signal with a frequency $f_c$ to a tag device;
    receiving means for receiving a backscatter signal obtained by a modulation of the carrier signal; and
    demodulating means for retrieving data transmitted from a tag device,
    wherein the interrogator further comprises inband interferer cancellation means for successively:
    a) estimating a phase and an amplitude of an inband interferer signal contained in the received modulated backscatter signal and having a frequency $f_c$ corresponding to the carrier frequency, said inband interferer signal being an effect of leakage of the carrier signal, said estimating including estimating the phase and the amplitude using the modulated backscatter signal as an input signal,
    b) generating a cancellation signal having an opposed phase and a same amplitude as the estimation of the inband interferer signal, and
    c) combining the cancellation signal with the received backscatter signal in order to reduce an influence of the inband interferer signal.

7. The interrogator according to claim 6, wherein said inband interferer cancellation means comprise tracking means for estimating the phase of the inband interferer signal.

8. The interrogator according to claim 6, wherein said inband interferer cancellation means comprise power estimating means for estimating a power of the inband interferer signal.

9. The interrogator according to claim 6, wherein said inband interferer cancellation means comprise a delay circuit for delaying the received backscatter signal before being combined with the cancellation signal.

10. An interrogator for use in a modulated backscatter system, said interrogator comprising:
    transmitting means for transmitting a continuous carrier signal with a frequency $f_c$ to a tag device;
    receiving means for receiving a backscatter signal obtained by a modulation of the carrier signal; and demodulating means for retrieving data transmitted from a tag device, wherein the interrogator further comprises two cancellation circuits for reducing an influence of an inband interferer signal contained in the received modulated backscatter signal in two following stages, said inband interferer signal being an effect of leakage of the carrier signal, and an output of a mixer is connected to an input of the second cancellation circuit, the second cancellation circuit including a pair of DC notch filters, and an input of the DC notch filters is an analog input.

11. The interrogator of claim 10, wherein the first cancellation circuit is a bandpass filter.

12. The interrogator of claim 11, wherein a mixer is located in front of the bandbass filter for down-converting the received modulated backscatter signal to an intermediate frequency $f_0$.

13. The interrogator of claim 10, wherein a quadrature mixer comprising two mixers is located in front of the pair of DC notch filters.

* * * * *